June 8, 1948.　　　　J. A. SENN　　　　2,442,783
TURBINE ROTOR
Filed July 1, 1944
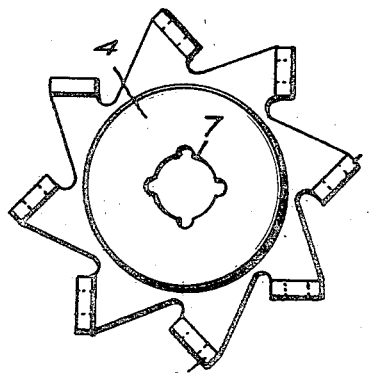
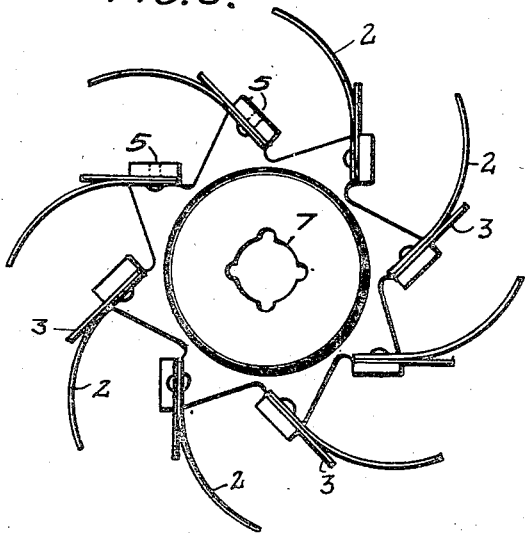
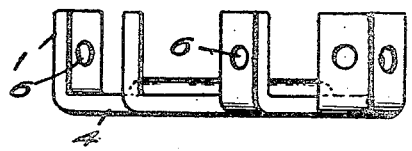
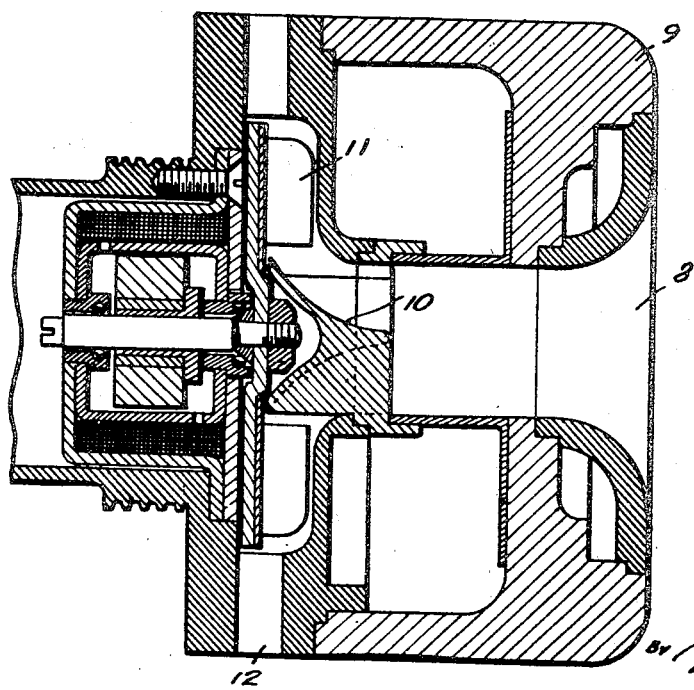
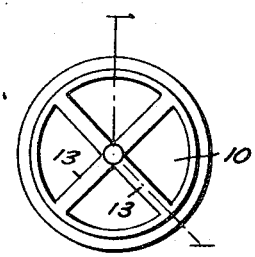
INVENTOR
JURG A. SENN
BY William D. Hall
ATTORNEYS Patented June 8, 1948

2,442,783

UNITED STATES PATENT OFFICE 2,442,783

TURBINE ROTOR

Jurg A. Senn, Mansfield, Ohio, assignor to the United States of America as represented by the Secretary of War Application July 1, 1944, Serial No. 543,182

2 Claims. (Cl. 253—39)

(Granted under the act of March 3, 1883, as amended April 30, 1928; 370 O. G. 757)

The invention described herein may be manufactured and used by or for the Government for governmental purposes, without the payment of any royalty thereon.

This invention relates to turbines, and more particularly to improvements in turbine rotors to provide automatic speed regulation.

In turbines operated by steam, air, water, or other fluids, it is often difficult to maintain a uniform speed, with the result, for example, that the voltage output of an electric generator connected to the turbine varies widely with variable fluid flow, or with variable load. This is objectionable where a constant value of voltage is desired, as the voltage of the generator varies as the speed of the turbine rotor.

It is, therefore, an object of this invention to provide in a turbine a rotor having flexible blades to compensate for variations of flow or load so that the speed regulation will be good without requiring bulky or complicated equipment for controlling speed.

This simple means and method of speed regulation is particularly valuable for air-driven turbines used to drive an electric generator where space is at a premium and simplicity of design is highly desirable from the standpoint of reliability and general operational efficiency.

A further object is to provide in a signal turbine means for automatic speed regulation, and having means to alter the speed characteristics to suit varied conditions.

These and other objects are attained by the novel arrangement and construction hereinafter described and illustrated by the accompanying drawings, forming a part hereof, and in which:

Figure 1 is a plan view of a rotor body used in the turbine.

Figure 2 is a side view of the rotor body.

Figure 3 is a plan view of the rotor body with flexible blades attached thereto.

Figure 4 is an axial sectional elevational view of an air turbine embodying the invention, connected to an electric generator.

Figure 5 is a plan view of an air distributing cone shown in Figure 4.

Referring to the drawings, there is shown a rotor including a spider body and attached blades. Flexible turbine blades 2 are suitably curved in one direction in a plane normal to the rotor axis, to deflect fluid, and are fastened to upturned lugs I integral with the rotor spider 4, by means of rivets 5 passing through holes 6 in the lugs I and through similar holes in the blades near their inner ends. It should be noted that the bases of the spider arms are in a plane parallel to that of the blades, and that the lugs I are planiform and each set at an angle of approximately forty-five degrees (or other angle) to a medial radius of the rotor axis, the blades being mounted at the inner sides of these lugs and diverging outwardly from the plane of the lug. As will appear, therefore, even if the blades should become straight under incident air pressure, they will still react to incident air. Blades 2 are made of flexible spring steel or any suitable resilient material and have their convex sides toward the lugs I. Shorter straight backing strips 3, which may be of the same material as the blades, are placed between the blades and the lugs I, and are likewise held by the rivets 5. These backing strips 3 are not essential, but are desirable for limiting automatic speed regulating effect. That is to say, as pressures on the blades acting in a radial direction from the cone 10 increase, the blades yield thereto and are flexed outwardly and clockwise as viewed in Fig. 3. The backing strips 3 prevent bending of the base portions of the blades beyond the planes of their base ends. Since radially moving air might otherwise by such bending force the outer ends of the blades so far as to diminish the moment of force derived too abruptly, the backing strips are effective to produce a symmetrical and sustained graph curve of diminution of the efficiency of the blades more nearly proportionate to a desired straight curve of speed required in the rotor over a certain operating range of air speeds. As a part of this function, the resistance of the outer parts of the blades to straightening flexure will increase as the points of effective blade support of the backing strips move outward under straightening of the blades, and a graph curve of torque and air speed will flatten progressively. Such curve might finally descend if the outer parts of the blades should be deformed to a reverse curve shape. The permanent angle of the base parts of the blades determined by the lugs I, however, preserves a substantial torque value.

The blades can be fastened to the lugs by screws, bolts, rivets, clamps, welding, or any other desired suitable means. Obviously, for small turbines, the rotor spider 4 can be stamped out of sheet metal. This could be done even for turbines of appreciably larger size. The rotor is fastened to a shaft by means of splines, nuts or other suitable means, the shaft passing through an aperture 7 in the spider 4.

Any suitable form of turbine housing can be used, and the fluid can be directed against the blades tangentially, or radially from the central area outward as shown in Figure 4.

The operation of the device depends upon the resultant of centrifugal force and reaction and fluid impact of air on the blades to reduce their curvature in proportion to the speed of rotation. When the blade curvature is reduced, the thrust on the blades tending to produce rotation is also reduced so that automatic regulation is attained. The greater the velocity of the fluid the greater will be the impact pressure tending to straighten the blades. In addition the centrifugal force on the blades, tending to straighten them, increases with increasing speed. The turbine rotor, therefore, tends to reach a limiting rotational velocity since the rotor driving torque is reduced as the blades are reduced in curvature.

Strip 3 serves as a stiffening member, furnishing support to the blade 2 at the lower end where bending stresses are greatest. At the same time strip 3 determines, in part, the levelling off or maximum speed of rotation of the turbine blade. This maximum speed can be varied by changing the length or stiffness of strips 3.

One form of turbine housing and fluid distributing cone is shown in Figure 4. Air is scooped by bell mouth 8 of turbine housing 9, and the gathered air striking the distributing cone 10 is turned from the axis, approximately at right angles, so that it passes radially outward through the turbine blades 11 and out exhaust duct 12. The same operation, modified as above described, will occur with the rotor of Fig. 3 substituted in the turbine of Fig. 4.

Figure 5 shows a view of the distributing cone 10 looking along the axis of the device shown in Figure 4, from right to left. Fins 13 act to reduce whirling movement of the air and to assist in distributing the air uniformly around the circumference, besides serving as strengthening elements.

It has been found that turbines with flexible rotor blades as disclosed provide remarkably good speed regulation so that a connected generator will produce a speed-voltage characteristic which is practically flat after a certain speed is reached.

While the turbine has been described in one embodiment it is obvious that self-regulating turbines based upon broadly similar principles can be used for many other purposes. Accordingly, the above description is to be considered illustrative and not limitative of the invention, of which modifications can be made without departing from the scope of the appended claims.

The invention having been described, what is claimed is:

1. A turbine rotor comprising a spider having a plurality of lugs spaced about its periphery, flexible metal blades attached to said lugs, said blades being curved longitudinally and yieldable to incident high speed currents, and members attached to said lugs and abutting said blades on the convex side thereof whereby said blades are strengthened and limited as to straightening action.

2. A self-governing turbine rotor comprising a spider having a plurality of lugs spaced about its periphery, flexible metal blades attached to said lugs, said blades being normally curved longitudinally, and members shorter than said blades attached to said lugs, said members abutting respective said blades on the convex sides thereof whereby said blades yield to incident high speed air currents and to high centrifugal force so as to tend to become straight at high rotor speeds, said blades being strengthened and limited as to straightening action by said members.

JURG A. SENN.

REFERENCES CITED

The following references are of record in the file of this patent:

UNITED STATES PATENTS

| Number | Name | Date |
|---|---|---|
| 1,015,552 | Gamon | Jan. 23, 1912 |
| 1,116,851 | Schneible | Nov. 10, 1914 |
| 1,511,541 | Thompson | Oct. 14, 1924 |
| 1,583,621 | Steinberg | May 4, 1926 |
| 1,712,527 | Suter | May 14, 1929 |
| 1,961,228 | Knox | June 5, 1934 |
| 2,044,532 | Kessel | June 16, 1936 |
| 2,281,144 | Dillon | Apr. 28, 1942 |

FOREIGN PATENTS

| Number | Country | Date |
|---|---|---|
| 105,654 | Norway | Sept. 6, 1899 |
| 143,960 | Germany | Sept. 5, 1903 |